United States Patent
Asahi et al.

(10) Patent No.: US 8,922,083 B2
(45) Date of Patent: Dec. 30, 2014

(54) ROTOR

(71) Applicant: Nidec Corporation, Kyoto (JP)

(72) Inventors: Kyohei Asahi, Kyoto (JP); Kenichiro Hamagishi, Kyoto (JP); Kuniaki Tanaka, Kyoto (JP); Susumu Terada, Kyoto (JP)

(73) Assignee: Nidec Corporation, Kyoto (JP)

( * ) Notice: Subject to any disclaimer, the term of this patent is extended or adjusted under 35 U.S.C. 154(b) by 156 days.

(21) Appl. No.: 13/735,127

(22) Filed: Jan. 7, 2013

(65) Prior Publication Data

US 2014/0042854 A1 Feb. 13, 2014

Related U.S. Application Data

(60) Provisional application No. 61/680,799, filed on Aug. 8, 2012.

(30) Foreign Application Priority Data

Aug. 7, 2012 (JP) .................................. 2012-174769

(51) Int. Cl.
*H02K 21/12* (2006.01)
*H02K 1/27* (2006.01)
*H02K 1/30* (2006.01)
*H02K 15/03* (2006.01)

(52) U.S. Cl.
CPC ............ *H02K 1/2706* (2013.01); *H02K 1/2773* (2013.01); *H02K 1/30* (2013.01); *H02K 15/03* (2013.01)
USPC ............. 310/156.08; 310/156.21; 310/156.23

(58) Field of Classification Search
USPC .................... 310/156.08–156.23, 43, 216.137
See application file for complete search history.

(56) References Cited

U.S. PATENT DOCUMENTS

| 5,581,140 | A | * | 12/1996 | Futami et al. ............ 310/156.53 |
| 5,786,650 | A | | 7/1998 | Uchida et al. |
| 5,829,120 | A | | 11/1998 | Uchida et al. |
| 5,886,441 | A | | 3/1999 | Uchida et al. |
| 5,889,346 | A | | 3/1999 | Uchida et al. |
| 5,939,810 | A | | 8/1999 | Uchida et al. |
| 6,147,428 | A | * | 11/2000 | Takezawa et al. ....... 310/156.57 |
| 7,939,985 | B2 | * | 5/2011 | Yamada ................. 310/216.114 |
| 2004/0145263 | A1 | * | 7/2004 | Kojima et al. ........... 310/156.23 |
| 2005/0229384 | A1 | * | 10/2005 | Yamamoto et al. ............. 29/598 |
| 2006/0138894 | A1 | * | 6/2006 | Harada et al. ................. 310/217 |
| 2007/0063607 | A1 | * | 3/2007 | Hattori ..................... 310/156.53 |
| 2008/0100165 | A1 | * | 5/2008 | Alston et al. ............ 310/156.19 |
| 2009/0026867 | A1 | * | 1/2009 | Haruno et al. .......... 310/156.21 |
| 2010/0061868 | A1 | * | 3/2010 | Kojima ...................... 417/410.1 |

FOREIGN PATENT DOCUMENTS

JP 6-245451 A 9/1994

* cited by examiner

*Primary Examiner* — Thanh Lam
(74) *Attorney, Agent, or Firm* — Keating & Bennett, LLP (57) ABSTRACT

A laminated core of a rotor includes an inner core portion and a plurality of outer core portions. The inner core portion axially extends in a cylindrical shape in a region located more radially inward than magnets. The outer core portions are arranged in a circumferential direction in a region located more radially outward than the inner core portion. The plurality of outer core portions and a plurality of the magnets are alternately arranged in the circumferential direction. Accordingly, magnetic flux generated from a pair of magnetic pole surfaces of the plurality of magnets can be effectively used. In addition, the laminated core includes caulking portions in each of the inner core portion and the plurality of outer core portions. Accordingly, a plurality of thin plate cores are firmly fixed.

14 Claims, 9 Drawing Sheets

ROTOR

BACKGROUND OF THE INVENTION

1. Field of the Invention

The present invention relates to a rotor and a motor.

2. Description of the Related Art

A so-called inner rotor type motor in which a rotor is disposed inside an armature is known. The types of rotors used in the inner rotor type motor are mainly classified into an SPM (Surface Permanent Magnet) type rotor in which a plurality of magnets are attached to the outer circumferential surface of a rotor core and an IPM (Interior Permanent Magnet) type rotor in which magnets are buried in a rotor core.

When the SPM type rotor is used, the armature and the magnets can be placed in proximity to each other. Therefore, the magnetic force of the magnets can be effectively used. However, in the SPM type rotor, measures to prevent the magnets from escaping outward due to a centrifugal force during high-speed rotation need to be prepared. On the other hand, when the IPM type rotor is used, there is no concern of the magnets escaping due to the centrifugal force. Therefore, recently, the IPM type rotor has been the mainstream type of rotor used.

However, in general, in any of the SPM type and IPM type rotors, each of the magnets is disposed so that a pair of magnetic pole surfaces are respectively directed radially outward and radially inward. Therefore, only the magnetic pole surface on the radial outside of the magnet contributes to motor driving. Here, recently, in order to effectively use the pair of magnetic pole surfaces of the magnet, a rotor structure in which magnets and cores of magnetic bodies are alternately arranged in the circumferential direction has been proposed.

A conventional rotor in which the magnets and the cores are alternately arranged in the circumferential direction is disclosed in, for example, Japanese Patent Application Publication no. 6-245451. The rotor in the Japanese Patent Application Publication no. 6-245451 includes six permanent magnets arranged at substantially equal intervals around a rotating shaft and six laminated core members which are respectively arranged between the respective permanent magnets and respectively forming magnetic poles (See, for example, the abstract and FIG. 1 of Japanese Patent Application Publication no. 6-245451).

As described in Japanese Patent Application Publication no. 6-245451, in a rotor core formed of laminated steel plates, a plurality of thin plate cores are bonded by a caulking operation (See, for example, the abstract and FIG. 3 of Japanese Patent Application Publication no. 6-245451). In addition, in order to further enhance the rigidity of the rotor core, it is preferable to provide a cylindrical core inside a plurality of cores arranged in the circumferential direction. However, when the cylindrical core is provided, it is difficult to firmly fix the plurality of thin plate cores only by performing caulking of the plurality of cores on the outside.

In particular, recently, an oil pump or a cooling fan has been reduced in size. Accordingly, a need for reduction in size of the inner rotor type motor used in such equipment has also increased. When the inner rotor type motor is to be reduced in size, it is more difficult to secure a region for performing caulking in the rotor core.

SUMMARY OF THE INVENTION

Preferred embodiments of the present invention provide a structure capable of firmly fixing a plurality of thin plate cores, in a rotor including a plurality of outer core portions and a plurality of magnets which are alternately arranged in a circumferential direction and including a cylindrical inner core portion.

A first preferred embodiment of the present application provides a rotor preferably for use in an inner rotor type motor, including a plurality of magnets which are arranged in a circumferential direction around a center axis that vertically extends; and a laminated core in which a plurality of thin plate cores are laminated in an axial direction, wherein the laminated core includes an inner core portion which axially extends in a cylindrical shape in a region located father radially inward than the plurality of magnets, and a plurality of outer core portions which are arranged in the circumferential direction in a region located farther radially outward than the inner core portion, the plurality of outer core portions and the plurality of magnets are alternately arranged in the circumferential direction, the magnet includes a pair of circumferential end surfaces which are magnetic pole surfaces, the magnetic pole surfaces of the plurality of magnets of the same pole face each other in the circumferential direction, the inner core portion includes inner core caulking portions that fix the plurality of thin plate cores, and the plurality of outer core portions include outer core caulking portions that respectively fix the plurality of thin plate cores.

A second preferred embodiment of the present invention provides a rotor preferably for use in an inner rotor type motor, including a plurality of magnets which are arranged in a circumferential direction around a center axis that vertically extends; a laminated core in which a plurality of thin plate cores are laminated in an axial direction; and a resin portion which covers both end surfaces in the axial direction of the laminated core and surfaces on an outside in a radial direction of the plurality of magnets, wherein the laminated core includes an inner core portion which axially extends in a cylindrical shape in a region radially located farther inward than the plurality of magnets, and a plurality of outer core portions which are arranged in the circumferential direction in a region located farther radially outward than the inner core portion, the plurality of outer core portions and the plurality of magnets are alternately arranged in the circumferential direction, the plurality of outer core portions and the plurality of magnets are alternately arranged in the circumferential direction, the magnetic pole surfaces of the plurality of magnets of the same pole face each other in the circumferential direction, the inner core portion and the plurality of outer core portions are connected by the resin portion, the inner core portion includes a plurality of protruding portions that protrude radially outward between the adjacent outer core portions in the circumferential direction and inner core caulking portions that are positioned in the protruding portions or in the radial inside of the protruding portions and fix the plurality of thin plate cores, and the plurality of outer core portions respectively include outer core caulking portions that fix the plurality of thin plate cores.

According to the first preferred embodiment of the present application, the plurality of outer core portions and the plurality of magnets are alternately arranged in the circumferential direction, and the magnetic pole surfaces of the magnet are directed in the circumferential direction. Therefore, unlike any general SPM type and IPM type rotors, the magnetic flux of the plurality of magnets can be effectively used. In addition, the rotor of a preferred embodiment of the present invention includes the caulking portions preferably provided in both the outer core portions and the inner core portion. Accordingly, the plurality of thin plate cores are firmly fixed.

According to the second preferred embodiment of the present invention, the plurality of outer core portions and the plurality of magnets are alternately arranged in the circumferential direction, and the magnetic pole surfaces of the magnet are directed in the circumferential direction. Therefore, unlike any general SPM type and IPM type rotors, the magnetic flux of the plurality of magnets can be effectively used. In addition, since the inner core portion and the outer core portions are connected by the resin portion, leakage of the magnetic flux from the outer core portions to the inner core portion is significantly reduced and prevented. In addition, the rotor according to a preferred embodiment of the present invention includes the caulking portions preferably provided in both the outer core portions and the inner core portion. Accordingly, the plurality of thin plate cores are firmly fixed. Moreover, in a preferred embodiment of the present invention, the inner core caulking portions are disposed in regions widened by the protruding portions. Accordingly, the inner core caulking portions can be made larger in size. As a result, the fixing strength of the plurality of thin plate cores may further be enhanced by the inner core caulking portions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings. In addition, in the present application, a direction parallel to the center axis of a rotor is referred to as an "axial direction", a direction orthogonal to the center axis of the rotor is referred to as a "radial direction", and a direction along the circular arc around the center axis of the rotor is referred to as a "circumferential direction". In addition, in the present application, shapes and positional relations of units will be described using the axial direction as a vertical direction. However, there is no intention of limiting the directions in the use of the rotor and a motor according to various preferred embodiments of the present invention due to the definition of the vertical direction.

In addition, in the present application, the "parallel direction" also includes a substantially parallel direction. In addition, in the present application, the "orthogonal direction" also includes a substantially orthogonal direction.

First Preferred Embodiment

Figure 1:
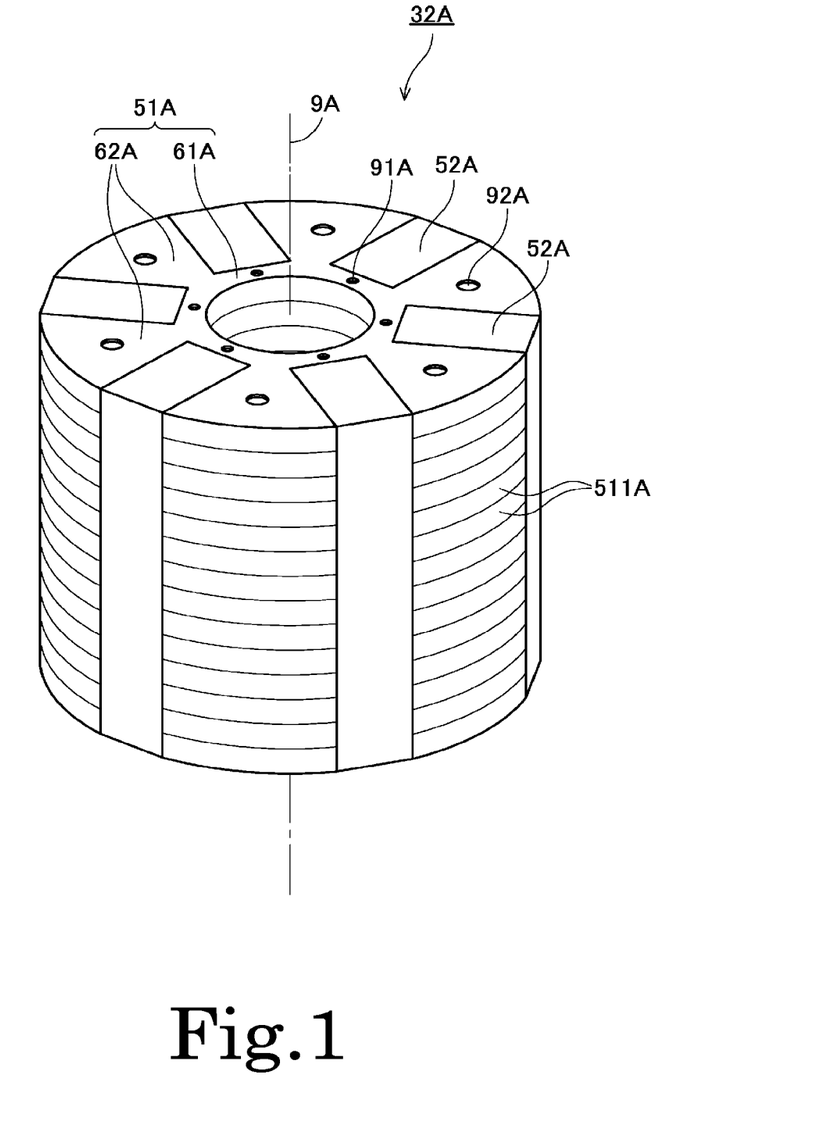
FIG. 1 is a perspective view of a rotor according to a first preferred embodiment of the present invention.

FIG. 1 is a perspective view of a rotor 32A according to a first preferred embodiment of the present invention. The rotor 32A is preferably used in an inner rotor type motor, for example. As illustrated in FIG. 1, the rotor 32A preferably includes a laminated core 51A and a plurality of magnets 52A. The laminated core 51A is defined by a plurality of thin plate cores 511A laminated in the axial direction. The plurality of magnets 52A are arranged in the circumferential direction around a center axis 9A extending vertically.

The laminated core 51A includes an inner core portion 61A and a plurality of outer core portions 62A. The inner core portion 61A axially extends in a cylindrical shape in a region located farther radially inward than the magnets 52A. The plurality of outer core portions 62A are arranged in the circumferential direction in a region located farther radially outward than the inner core portion 61A. The plurality of outer core portions 62A and the plurality of magnets 52A are alternately arranged in the circumferential direction. The magnet 52A includes a pair of circumferential end surfaces which are magnetic pole surfaces. In addition, the plurality of magnets 52A are arranged so that the magnetic pole surfaces of the same pole face each other in the circumferential direction. Accordingly, the magnetic flux that is generated from the pair of magnetic pole surfaces of the magnet 52A is effectively used.

As illustrated in FIG. 1, the inner core portion 61A preferably includes a plurality of inner core caulking portions 91A. In addition, the plurality of outer core portions 62A preferably respectively include outer core caulking portions 92A. The plurality of thin plate cores 511A are fixed to one another by the plurality of inner core caulking portions 91A and the plurality of outer core caulking portions 92A. As such, the rotor 32A in this preferred embodiment preferably includes the caulking portions in both the inner core portion 61A and the outer core portions 62A. Accordingly, the plurality of thin plate cores 511A are firmly fixed.

In addition, in FIG. 1, the plurality of inner core caulking portions 91A are preferably provided at the same positions in the circumferential direction as those of the plurality of magnets 52A. However, the positions of the inner core caulking portions 91A are not limited to the example of FIG. 1. For example, the plurality of inner core caulking portions 91A may be provided at the same positions in the circumferential direction as those of the plurality of outer core portions 62A.

Second Preferred Embodiment

Figure 2:
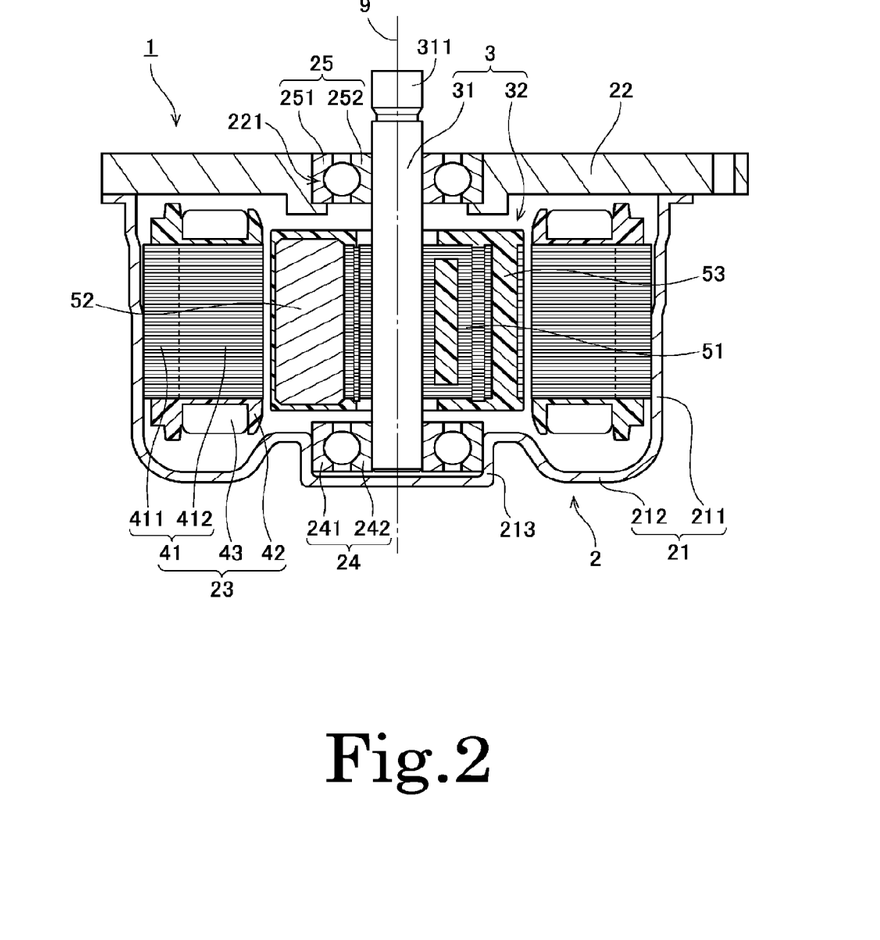
FIG. 2 is a longitudinal sectional view of a motor according to a second preferred embodiment of the present invention.

Subsequently, a second preferred embodiment of the present invention will be described. FIG. 2 is a longitudinal sectional view of a motor 1 according to the second preferred embodiment. The motor 1 in this preferred embodiment is preferably mounted in, for example, a vehicle and is used, for example, as a driving source of an engine cooling fan, an oil pump, etc. However, the motor of various preferred embodiments of the present invention may also be used for purposes other than the engine cooling fan or the oil pump. For example, the motor of various preferred embodiments of the present invention may also be used as a driving source for power steering. In addition, the motor of various preferred embodiments of the present invention may be mounted in electric appliances, office automation equipment, medical equipment, and the like to generate various driving forces, for example.

The motor 1 is a so-called inner rotor type motor in which a rotor 32 is disposed in the radial inside of an armature 23. As illustrated in FIG. 2, the motor 1 includes a stationary section 2 and a rotating section 3. The stationary section 2 is fixed to the frame body of a device which is a driving object. The rotating section 3 is rotatably supported with respect to the stationary section 2.

The stationary section 2 in this preferred embodiment preferably includes a housing 21, a lid portion 22, the armature 23, a lower bearing portion 24, and an upper bearing portion 25.

The housing 21 preferably includes a side wall 211 of a substantially cylindrical shape and a bottom portion 212 that blocks the lower portion of the side wall 211. The lid portion covers the opening of the upper portion of the housing 21. The armature 23 and the rotor 32, which will be described later, are accommodated in an internal space surrounded by the housing 21 and the lid portion 22. At the center of the bottom portion 212 of the housing 21, a concave portion 213 arranged to support the lower bearing portion 24 is provided. In addition, at the center of the lid portion 22, a circular hole 221 arranged to support the upper bearing portion 25 is provided.

The armature 23 is disposed in the radial outside of the rotor 32 which will be described later. The armature 23 preferably includes a stator core 41, an insulator 42, and a coil 43. The stator core 41 is preferably defined by laminated steel plates in which electromagnetic steel plates are laminated in the axial direction. The stator core 41 preferably includes an annular core back 411 and a plurality of teeth 412 that protrude radially inward from the core back 411. The core back 411 is disposed on substantially the same axis as a center axis 9. In addition, the outer circumferential surface of the core back 411 is fixed to the inner circumferential surface of the side wall 211 of the housing 21. The plurality of teeth 412 are arranged at substantially equal intervals in the circumferential direction.

The insulator 42 is preferably made of a resin, which is an electrically insulating body. The upper surface, the lower surface, and both side surfaces in the circumferential direction of each of the teeth 412 are covered with the insulator 42. The coil 43 is preferably defined by conductive wires wound around the insulator 42. That is, in this preferred embodiment, the conductive wires are wound around the teeth 412 with the insulator 42 interposed therebetween. The insulator 42 is interposed between the teeth 412 and the coil 43 and thus prevents the teeth 412 and the coil 43 from being electrically short-circuited.

Alternatively, instead of the insulator 42, insulation coating may be provided on the surfaces of the teeth 412 if so desired.

The lower bearing portion 24 and the upper bearing portion 25 are respectively disposed between the housing 21 and the lid portion 22, and a shaft 31 on the rotating section 3. In the lower bearing portion 24 and the upper bearing portion 25 in this preferred embodiment, a ball bearing that rotates an outer race and an inner race relative to each other through spherical bodies is preferably used. However, instead of the ball bearing, other types of bearings such as, for example, sliding bearings, fluid bearings, etc. may also be used.

An outer race 241 of the lower bearing portion 24 is disposed in the concave portion 213 of the housing 21 to be fixed to the housing 21. In addition, an outer race 251 of the upper bearing portion 25 is disposed in the circular hole 221 of the lid portion 22 to be fixed to the lid portion 22. On the other hand, inner races 242 and 252 of the lower bearing portion 24 and the upper bearing portion 25 are fixed to the shaft 31. Accordingly, the shaft 31 is rotatably supported with respect to the housing 21 and the lid portion 22.

Figure 3:
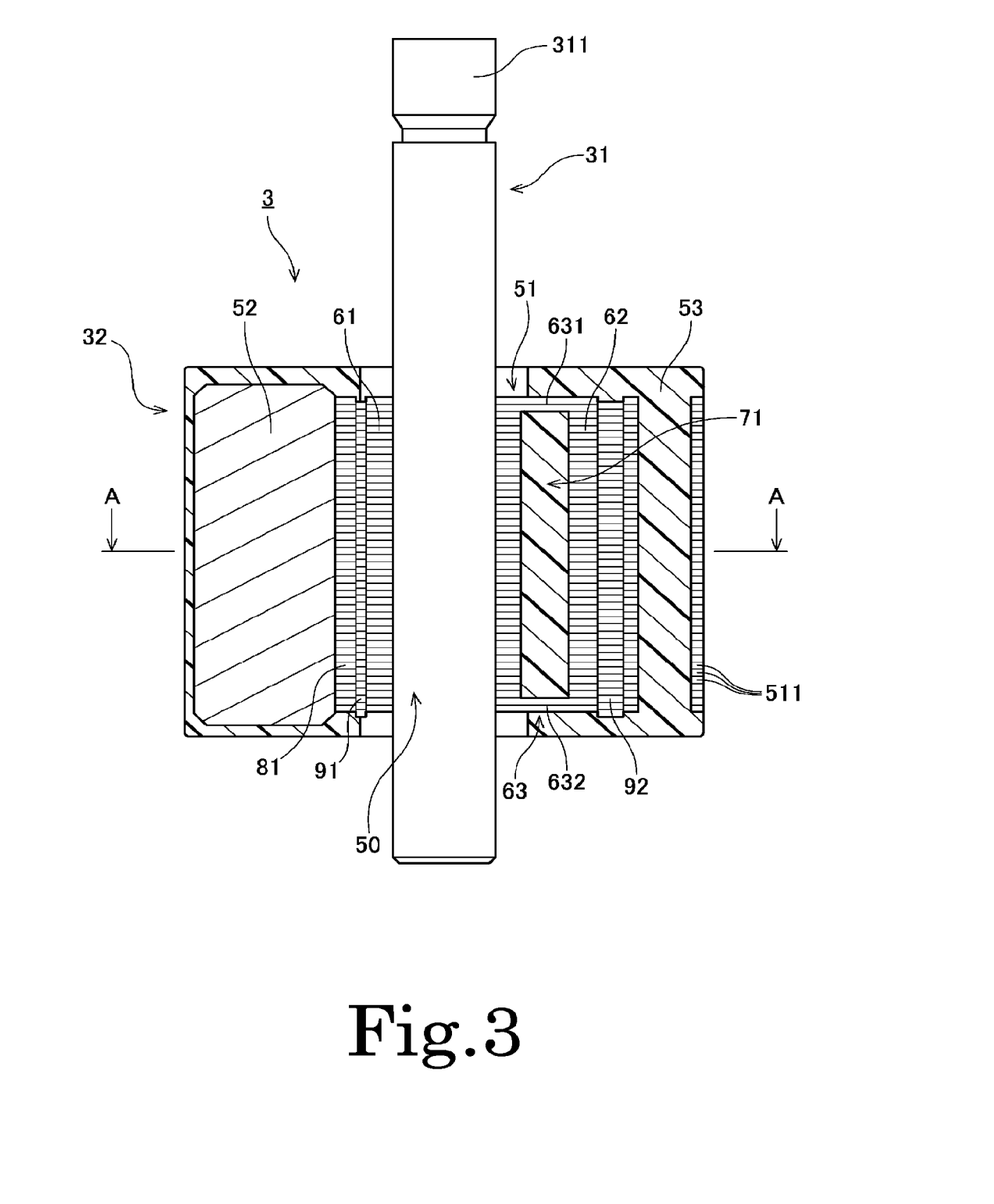
FIG. 3 is a longitudinal sectional view of a rotating section according to the second preferred embodiment of the present invention.

FIG. 3 is a longitudinal sectional view of the rotating section 3. As illustrated in FIGS. 2 and 3, the rotating section 3 in this preferred embodiment includes the shaft 31 and the rotor 32.

The shaft 31 is preferably a columnar member extending along the center axis 9. Stainless steel, for example, is preferably used as the material of the shaft 31. The shaft 31 is supported by the lower bearing portion 24 and the upper bearing portion 25 described above, and at the same time rotates about the center axis 9. In addition, the shaft 31 preferably includes a head portion 311 protruding further upward than the lid portion 22. The head portion 311 is preferably connected to a part which is the driving object with a power transmission mechanism such as, for example, gears.

The rotor 32 is disposed radially inside of the armature 23 and rotates along with the shaft 31. The rotor 32 preferably includes a laminated core 51, a plurality of magnets 52, and a resin portion 53. The laminated core 51 is preferably defined by a plurality of thin plate cores 511 which are electromagnetic steel plates. The plurality of thin plate cores 511 are laminated in the axial direction to define laminated steel plates. When the laminated steel plates are used, eddy currents that occur in the laminated core 51 may be significantly reduced and prevented. Therefore, magnetic flux can efficiently flow in the laminated core 51. A through-hole 50 extending in the axial direction is preferably provided at the center of the laminated core 51. The shaft 31 is preferably press-fitted into the through-hole 50 of the laminated core 51.

The plurality of magnets 52 are arranged at substantially equal intervals in the circumferential direction around the center axis 9. In this preferred embodiment, the magnet 52 of a substantially rectangular parallelepiped shape is used. However, any other suitable shape could be used for the magnet 52. Both end surfaces in the axial direction of the laminated core 51 and the plurality of magnets 52, and the surfaces on the radial outside of the magnets 52 are preferably covered with the resin portion 53. Accordingly, upward, downward, or radially outward movement of the magnets 52 with respect to the rotor 32 is prevented. In addition, the rigidity of the entire rotor 32 is enhanced by the resin portion 53.

In addition, the term "cover" described herein includes an arrangement to cover not only to the entire surface of an object but also includes an arrangement that covers only a portion of the surface of an object. For example, the entire surface on the radial outside of the magnet 52 may be covered with the resin portion 53, or only a portion of the surface on the radial outside of the magnet 52 may be covered with the resin portion 53. A more detailed structure of the rotor 32 will be described later.

In the motor 1, when a driving current is applied to the coil 43 of the stationary section 2, magnetic flux is generated in the plurality of teeth 412. In addition, a torque in the circumferential direction is generated by the interaction of the magnetic flux of the teeth 412 with that of the rotor 32. As a result, the rotating section 3 rotates about the center axis 9 with respect to the stationary section 2.

Figure 4:
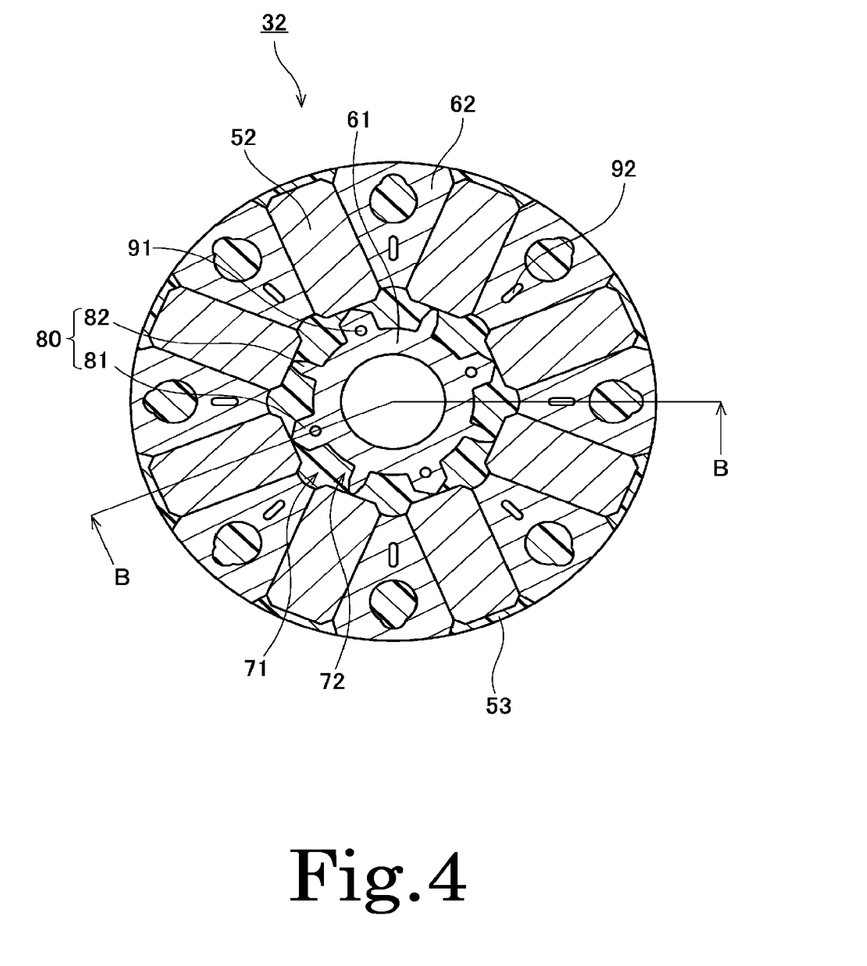
FIG. 4 is a transverse sectional view of a rotor according to the second preferred embodiment of the present invention.
Figure 5:
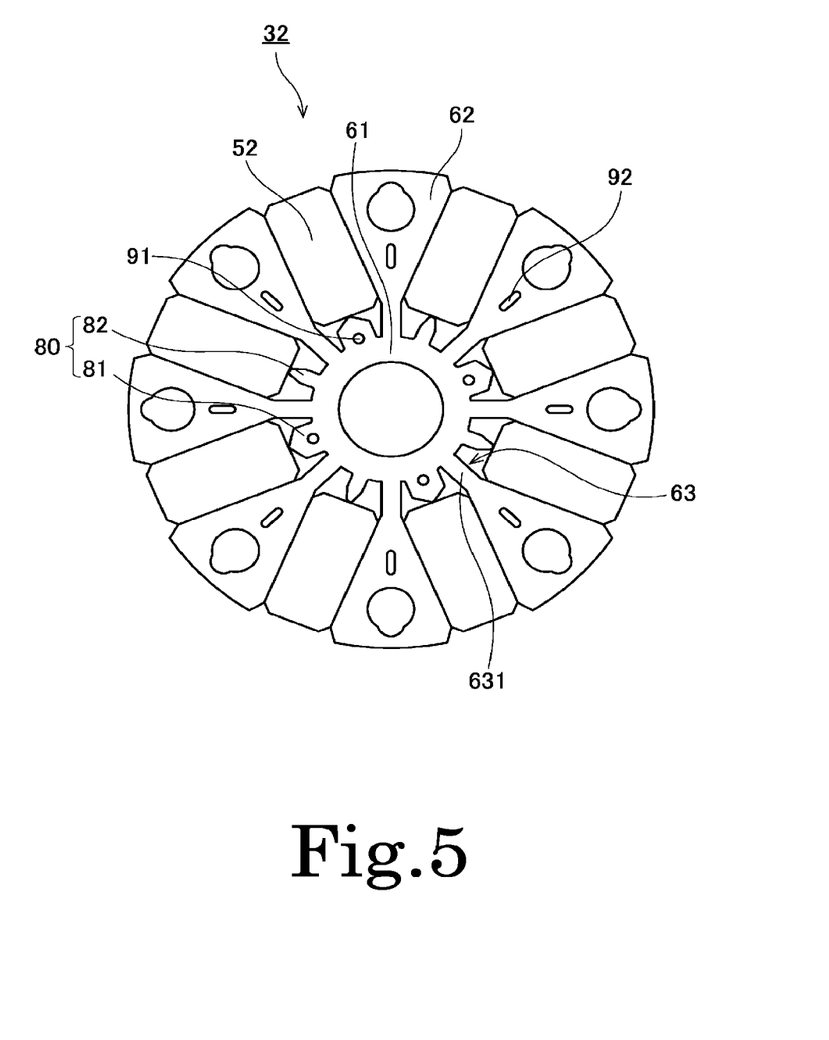
FIG. 5 is a plan view of a laminated core and a plurality of magnets according to the second preferred embodiment of the present invention.

Subsequently, the more detailed structure of the rotor 32 will be described. FIG. 4 is a transverse sectional view of the rotor 32 viewed from the position A-A in FIG. 3. FIG. 5 is a plan view of the laminated core 51 and the plurality of magnets 52. The following description will be provided with reference to FIGS. 4 and 5 as well as FIG. 3. In addition, the longitudinal cross-section of the rotor 32 in FIG. 3 corresponds to the position B-B in FIG. 4.

As illustrated in FIGS. 3 to 5, the laminated core 51 includes an inner core portion 61 and a plurality of outer core portions 62. The inner core portion 61 axially extends in the cylindrical shape in a region located farther radially inward than the magnets 52. The plurality of outer core portions 62 are arranged at substantially equal intervals in the circumferential direction in a region radially located farther outward than the inner core portion 61. As illustrated in FIGS. 4 and 5, each of the outer core portions 62 has a substantially fan shaped external configuration in plan view. In addition, each of the outer core portions 62 extends in the axial direction.

The plurality of magnets 52 are respectively arranged between the adjacent outer core portions 62. That is, the plurality of magnets 52 and the plurality of outer core portions are alternately arranged in the circumferential direction. Each of the magnets 52 includes a pair of circumferential end surfaces which are magnetic pole surfaces. The plurality of magnets 52 are arranged so that the magnetic pole surfaces of the same pole face each other in the circumferential direction. Each of the outer core portions 62 is magnetized by the magnets 52 disposed on both sides thereof. As a result, the surface on the radial outside of the outer core portion 62 becomes the magnetic pole surface. That is, most of the magnetic flux generated by the magnets 52 flows radially outward of the outer core portion 62 through the outer core portion 62.

As the magnet 52, for example, a ferrite-based sintered magnet or a neodymium magnet is preferably used. However, recently, the price of neodymium which is a rare earth element has soared, and it has become difficult to use the neodymium magnet. For this reason, there is a high technical demand for obtaining a strong magnetic force while using the ferrite-based sintered magnet. In this respect, as in this preferred embodiment, by alternately arranging the plurality of outer core portions 62 and the plurality of magnets 52 in the circumferential direction, the volume ratio of the magnets 52 in the rotor 32 can increase. In addition, the magnetic flux generated by the pair of magnetic pole surfaces of each of the magnets 52 can be effectively used. Therefore, it is possible to use the ferrite-based sintered magnet and, at the same time, to also obtain a strong magnetic force.

The resin portion 53 is preferably obtained by performing injection molding of a resin such as, for example, polycarbonate. During injection molding of the resin portion 53, after the laminated core 51 and the plurality of magnets 52 are disposed inside a mold in advance, a molten resin is injected into the mold. That is, insert molding is performed using the laminated core 51 and the plurality of magnets 52 as insert components. Accordingly, the resin portion 53 is molded, and the laminated core 51, the plurality of magnets 52, and the resin portion 53 are fixed to each other.

As illustrated in FIGS. 3 and 5, the laminated core 51 preferably includes a plurality of connection portions 63 that connect the inner core portion 61 to the plurality of outer core portions 62. Each of the connection portions 63 connects the outer circumferential surface of the inner core portion 61 to the end portion on radial the inside of the outer core portion in the radial direction. The relative positional relation between the inner core portion 61 and the plurality of outer core portions 62 is fixed by the connection portions 63. Therefore, during the injection molding of the resin portion 53, the inner core portion 61 and the plurality of outer core portions 62 can be easily positioned in the mold.

The connection portions 63 may be provided in at least one of the plurality of thin plate cores 511. That is, between the inner core portion 61 and each of the outer core portions 62, at least one of the plurality of thin plate cores 511 may be connected in the radial direction. As illustrated in FIG. 3, the plurality of connection portions 63 in this preferred embodiment preferably include a plurality of upper connection portions 631 and a plurality of lower connection portions 632. The upper connection portions 631 are positioned higher than the center in the axial direction of the laminated core 51 and are defined by a single one or by a plurality of thin plate cores 511 at the top. The lower connection portions 632 are positioned lower than the center in the axial direction of the laminated core 51 and are defined by a single one or by a plurality of thin plate cores 511 at the bottom.

A first magnetic gap 71 is preferably interposed between the upper connection portions 631 and the lower connection portions 632. The first magnetic gap 71 is filled with a portion of the resin portion 53 which is a non-magnetic body. In this case, the leakage of the magnetic flux from the outer core portions 62 to the inner core portion 61 in the vicinity of the center in the axial direction of the laminated core 51 is suppressed. In addition, by filling the first magnetic gap 71 with the resin, the rigidity of the rotor 32 further increases.

In addition, as illustrated in FIG. 4, at a position in the circumferential direction between the adjacent outer core portions 62, in the radial outside of the inner core portion 61, and in the radial inside of the magnets 52, a second magnetic gap 72 is provided. Accordingly, the leakage of the magnetic flux from the magnets 52 to the inner core portion 61 is further suppressed. In addition, the inner core portion 61 preferably includes a plurality of protruding portions 80 protruding radially outward toward the second magnetic gap 72. The end portion on radial the outside of the protruding portion 80 comes into contact with the end surface on the radial inside of the magnet 52. Accordingly, the magnet 52 is positioned in the radial direction.

In addition, the second magnetic gap 72 is also filled with a portion of the resin portion 53 which is a non-magnetic body. By filling the second magnetic gap 72 with the resin, the rigidity of the rotor 32 further increases.

Figure 6:
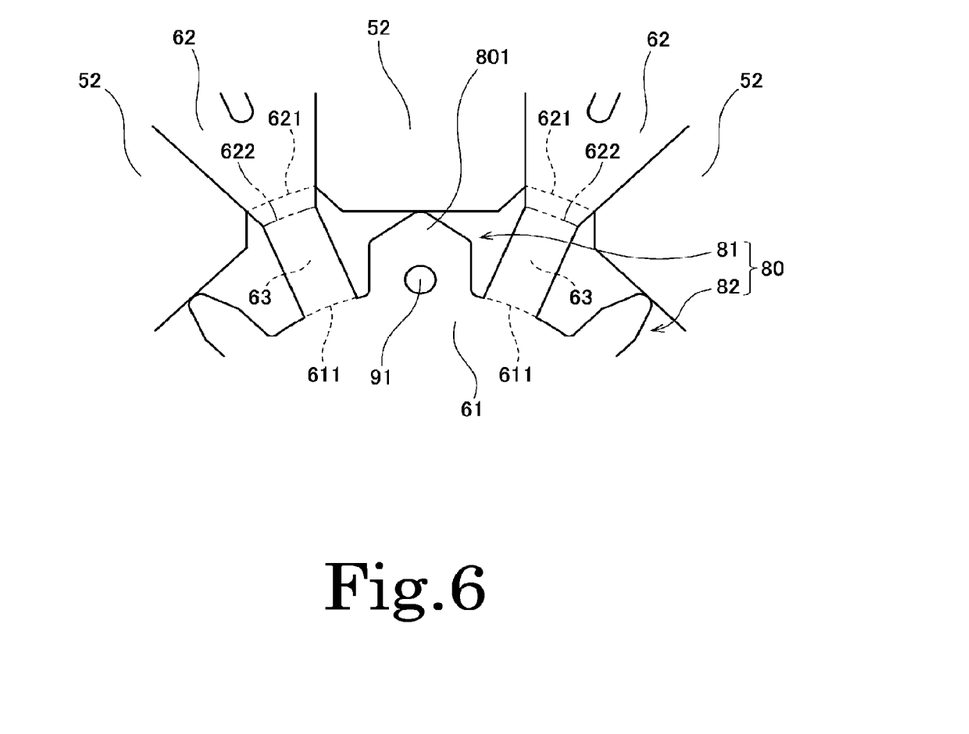
FIG. 6 is a partial plan view of the laminated core and the plurality of magnets according to the second preferred embodiment of the present invention.

FIG. 6 is a partial plan view of the laminated core 51 and the plurality of magnets 52. As illustrated in FIG. 6, the protruding portion 80 in this preferred embodiment preferably includes a converging portion 801. The width in the circumferential direction of the converging portion 801 decreases as it heads radially outward. In addition, the apex portion on the radial outside of the converging portion 801 comes into contact with the end surface on the radial inside of the magnet 52. Because of this, the contact area between the protruding portion 80 and the magnet 52 can be reduced in addition to positioning the magnet 52 in the radial direction. Therefore, the amount of magnetic flux flowing to the inner core portion 61 from the magnet 52 via the protruding portion 80 can be reduced.

In FIG. 6, the outer circumferential surface of the inner core portion 61 at the position in the axial direction where the connection portion 63 is not provided is shown by a broken line 611. In addition, in FIG. 6, the end portion on the radial inside of the outer core portion 62 at the position in the axial direction where the connection portion 63 is not provided is shown by a broken line 621. In this preferred embodiment, the apex portion of the protruding portion 80 is positioned farther radially inward compared to the corresponding end portion on the radial inside of the outer core portion 62. Accordingly, a space in which the magnet 52 is housed is widened. Therefore, the volume ratio of the magnets 52 in the rotor 32 can further increases. As a result, a stronger magnetic force can be obtained.

In addition, the end portion on the radial inside of the outer core portion 62 may be positioned farther radially inward than the position of the broken line 621 in FIG. 6. For example, the end portion on the radial inside of the outer core portion 62 may be at the position of a chain double-dashed line 622 in FIG. 6. In addition, the end portion on the radial inside of the outer core portion 62 and the apex portion of the protruding portion 80 may be disposed at substantially the same position in the radial direction. In addition, the end portion on the radial inside of the outer core portion 62 may have an arc shape in plan view like the broken line 621 or the chain double-dashed line 622 in FIG. 6 or may have a linear shape in plan view.

As illustrated in FIGS. 3 to 6, the inner core portion preferably includes a plurality of inner core caulking portions 91. The plurality of inner core caulking portions 91 are arranged at substantially equal intervals in the circumferential direction. In addition, the plurality of outer core portions 62 respectively include outer core caulking portions 92. In the inner core caulking portions 91 and the outer core caulking portions 92, as in FIG. 3, the plurality of thin plate cores 511 are subjected to plastic deformation in the axial direction. Accordingly, the plurality of thin plate cores 511 are fixed to one another. The rotor 32 in this preferred embodiment preferably includes the caulking portions in each of the inner core portion 61 and the plurality of outer core portions 62. As a result, the plurality of thin plate cores 511 are firmly fixed.

In addition, the inner core caulking portions 91 suppress the flow of the magnetic flux in the inner core portion 61. That is, the magnetic resistance of the inner core portion 61 is higher in a case where the inner core caulking portions 91 are provided as opposed to a case where inner core caulking portions 91 are not provided. Therefore, the leakage of the magnetic flux from the magnet 52 or the outer core portion 62 to the inner core portion 61 is further suppressed. As a result, the magnetic force of the magnet 52 is more efficiently used for driving the motor 1.

As illustrated in FIGS. 4 to 6, it is preferable that the inner core caulking portions 91 be positioned in the protruding portions 80 or radially inside of the protruding portions 80. That is, it is preferable that the inner core caulking portions 91 be positioned in regions widened by the protruding portions 80. By doing this, the inner core caulking portions 91 can have a larger size in plan view. Therefore, the plurality of thin plate cores 511 can be fixed more firmly by the inner core caulking portions 91.

In addition, the plurality of protruding portions 80 in this preferred embodiment preferably include a plurality of wide protruding portions 81 and a plurality of narrow protruding portions 82. The width in the circumferential direction of each of the narrow protruding portions 82 is smaller than the width in the circumferential direction of each of the wide protruding portions 81. In addition, the inner core caulking portions 91 are positioned in the wide protruding portions 81 or in the radial inside of the wide protruding portions 81. In this case, the inner core caulking portions 91 may be disposed in wider regions. Therefore, the inner core caulking portions 91 can be formed larger in size in plan view. As a result, the plurality of thin plate cores 511 can be fixed more firmly by the inner core caulking portions 91.

Meanwhile, since the width in the circumferential direction of the protruding portion 80 where the inner core caulking portion 91 is not disposed, that is, the narrow protruding portion 82 is smaller than the width in the circumferential direction of the wide protruding portion 81, the leakage of the magnetic flux from the magnet 52 to the inner core portion 61 is further suppressed. In addition, in this preferred embodiment, the plurality of wide protruding portions and the plurality of narrow protruding portions 82 are alternately arranged in the circumferential direction. Accordingly, bias in the circumferential direction of magnetic characteristics is significantly reduced and prevented.

In addition, as illustrated in FIG. 3, in this preferred embodiment, the wide protruding portions 81 are defined by all of the thin plate cores 511 that define the inner core portion 61. That is, all of the thin plate cores 511 preferably have projections that define the wide protruding portions 81. In addition, the inner core caulking portions 91 are provided in the wide protruding portions 81. Therefore, all of the thin plate cores 511 are fixed by the inner core caulking portions 91.

Figure 7:
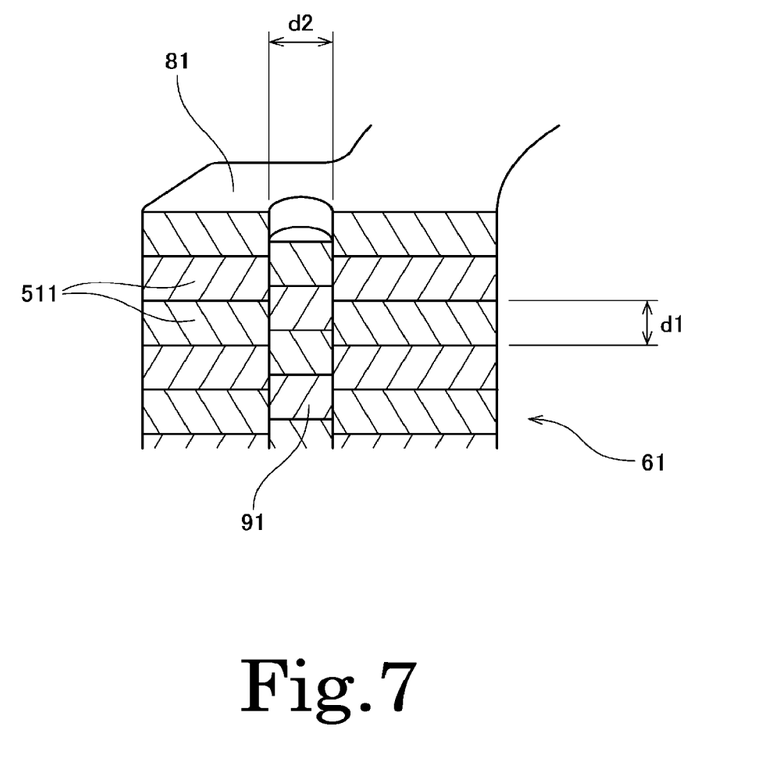
FIG. 7 is a partial cutaway perspective view of an inner core portion according to the second preferred embodiment of the present invention.

FIG. 7 is a partial cutaway perspective view of the inner core portion 61 in the vicinity of the wide protruding portions 81. As illustrated in FIGS. 4 to 7, the inner core caulking portions 91 in this preferred embodiment are preferably substantially circular in plan view. In order to increase the fixing strength by the inner core caulking portions 91, it is preferable that the value of d2/d1 be large, where the thickness in the axial direction of the thin plate core 511 is d1 and the length of the diameter of the inner core caulking portion 91 in plan view is d2. For example, it is preferable that a relation of d2≥d1 be held. In addition, the inner core caulking portion may be elliptical in plan view. In the case of an ellipse, assuming that the length of the shortest diameter of the inner core caulking portion in plan view is d2, it is preferable that the above relation be held. In addition, for example, it is preferable that the area of each of the inner core caulking portions 91 in plan view be greater than or equal to about 0.5 times of the area of a circle having a radius of d1 which is the thickness in the axial direction of the thin plate core 511, for example.

Modified Preferred Embodiments

Exemplary preferred embodiments of the present invention have been described above, however, the present invention is not limited to the above preferred embodiments.

Figure 8:
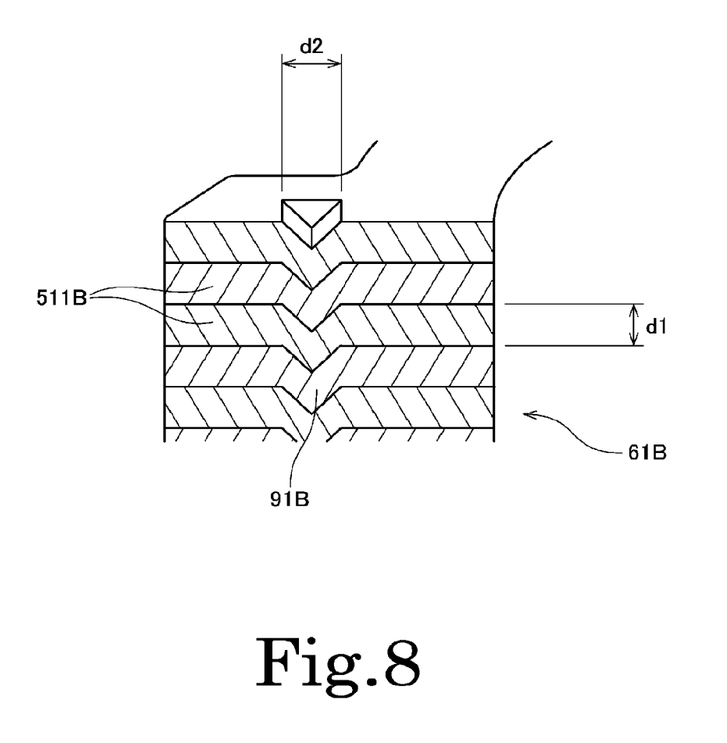
FIG. 8 is a partial cutaway perspective view of an inner core portion according to a modified example of a preferred embodiment of the present invention.

FIG. 8 is a partial cutaway perspective view of an inner core portion 61B according to a modified example of a preferred embodiment of the present invention. In the example of FIG. 8, a plurality of thin plate cores 511B are caulked in substantially V-shapes in cross-sectional view, thereby defining inner core caulking portions 91B. In addition, the inner core caulking portion 91B of FIG. 8 is substantially square or substantially rectangular in plan view. In this case, in order to increase the fixing strength using the inner core caulking portion 91B, it is preferable that the value of d2/d1 be large, where the thickness in the axial direction of the thin plate core 511B is d1 and the length of the shortest side of the inner core caulking portion 91B in plan view is d2. For example, it is preferable that a relationship of d2≥d1 be satisfied. In addition, for example, it is preferable that the area of each of the inner core caulking portions 91B in plan view be greater than or equal to about 0.5 times of the area of a circle having a radius of d1 which is the thickness in the axial direction of the thin plate core 511.

Figure 9:
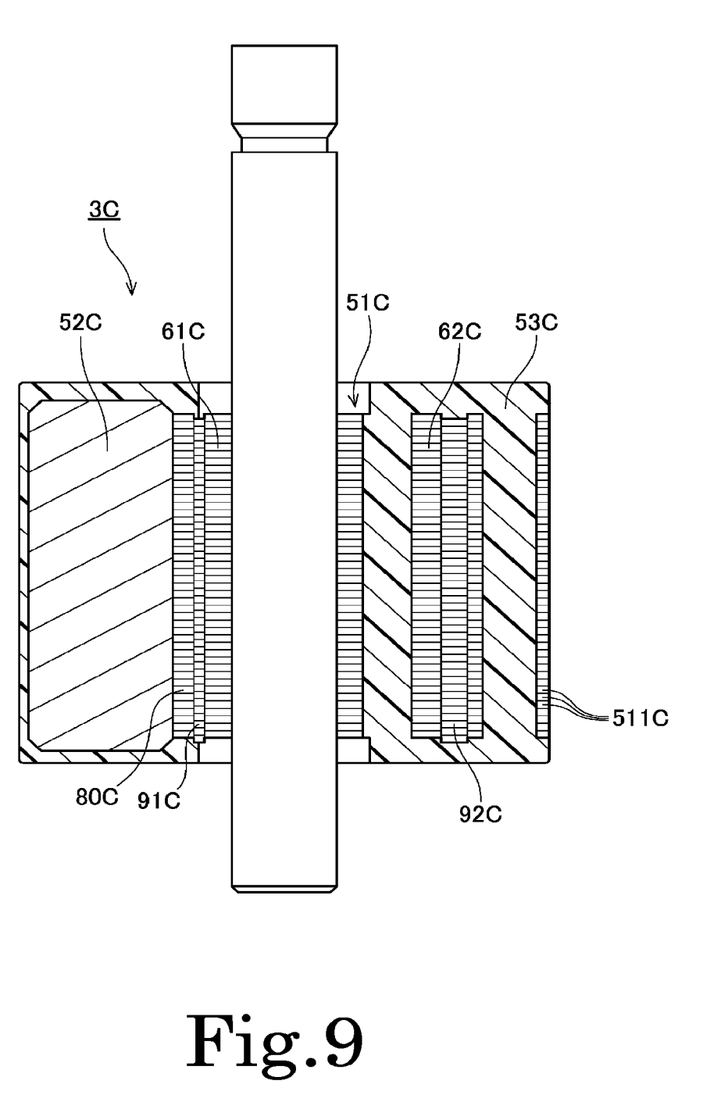
FIG. 9 is a longitudinal sectional view of a rotating section according to a modified example of a preferred embodiment of the present invention.

FIG. 9 is a longitudinal sectional view of a rotating section 3C according to another modified example of a preferred embodiment of the present invention. In the example of FIG. 9, connection portions are preferably not provided between an inner core portion 61C and a plurality of outer core portions 62C. That is, the inner core portion 61C and the plurality of outer core portions 62C are separate members. In addition, in the example of FIG. 9, the inner core portion 61C and the plurality of outer core portions 62C are preferably connected by a resin portion 53C.

Even in the structure of FIG. 9, by alternately arranging the plurality of outer core portions 62C and a plurality of magnets 52C in the circumferential direction, the magnetic flux of the magnets 52C can be effectively used. In addition, since the inner core portion 61C and the plurality of outer core portions 62C are connected by the resin portion 53C which is a non-magnetic body, the leakage of the magnetic flux from the outer core portion 62C to the inner core portion 61C is further suppressed.

In addition, even in the structure of FIG. 9, the inner core portion 61C includes a plurality of inner core caulking portions 91C. In addition, the plurality of outer core portions 62C preferably respectively include outer core caulking portions 92C. That is, the laminated core 51C of FIG. 9 includes the caulking portions in both the inner core portion 61C and the outer core portions 62C. Accordingly, a plurality of thin plate cores 511C are firmly fixed.

In addition, in the example of FIG. 9, a plurality of protruding portions 80C are provided in the inner core portion 61C. Each of the protruding portions 80C protrudes radially outward between the adjacent outer core portions 62C in the circumferential direction. In addition, the inner core caulking portions 91C are positioned in the protruding portions 80C or in the radial inside of the protruding portions 80C. That is, the inner core caulking portions 91C are positioned in regions widened by the protruding portions 80C. Therefore, in plan view, the inner core caulking portions 91C can be larger in size. Therefore, the plurality of thin plate cores 511C can be fixed more firmly by the inner core caulking portions 91C.

In addition, the shapes of the details of each member of the preferred embodiments of the present invention may be different from the shapes illustrated in the drawings of the present application. For example, the shape of the through-hole provided in each of the outer core portions may be substantially circular in plan view as in the drawings of the present application and may also be elliptical or rectangular in plan view. In addition, the elements that appear in the preferred embodiments or the modified examples may be appropriately combined without causing contradiction.

The preferred embodiments of the present invention and modifications thereof may be used for a rotor and a motor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor comprising:
 a plurality of magnets arranged in a circumferential direction around a center axis which vertically extends; and
 a laminated core in which a plurality of thin plate cores are laminated in an axial direction; wherein
 the laminated core includes an inner core portion which axially extends in a cylindrical shape in a region located farther radially inward than the magnets, and a plurality of outer core portions which are arranged in the circumferential direction in a region located farther radially outward than the inner core portion;
 the plurality of outer core portions and the plurality of magnets are alternately arranged in the circumferential direction;
 the plurality of magnets include a pair of circumferential end surfaces which are magnetic pole surfaces;
 the magnetic pole surfaces of the plurality of magnets of the same pole face each other in the circumferential direction;
 the inner core portion includes inner core caulking portions which fix the plurality of thin plate cores; and
 the plurality of outer core portions include outer core caulking portions which fix the plurality of thin plate cores respectively.

2. The rotor according to claim 1, wherein a magnetic gap which extends in the axial direction is provided at a position in the circumferential direction between the adjacent outer core portions and in the radial inside of the magnets;
 the inner core portion includes a plurality of protruding portions which protrude radially outward toward the magnetic gap; and
 the inner core caulking portions are positioned in the plurality of protruding portions or radially inside of the plurality of protruding portions.

3. The rotor according to claim 2, wherein the plurality of protruding portion include a converging portion of which a width in the circumferential direction decreases in a radially outward direction; and
 an apex portion on the radial outside of the converging portion and the end surface on the radial inside of the plurality of magnet come into contact with each other.

4. The rotor according to claim 3, wherein the apex portion is positioned farther radially inward than the end surface on the radial inside of the plurality of outer core portions.

5. The rotor according to claim 2, wherein the plurality of protruding portions include wide protruding portions, and narrow protruding portions of which widths in the circumferential direction are smaller than those of the wide protruding portions; and
 the inner core caulking portions are positioned in the wide protruding portions or radially inside of the wide protruding portions.

6. The rotor according to claim 5, wherein a plurality of the wide protruding portions and a plurality of the narrow protruding portions are alternately arranged in the circumferential direction.

7. The rotor according to claim 5, wherein all of the thin plate cores which define the inner core portion include projections which define the wide protruding portions.

8. The rotor according to claim 1, wherein an area of each of the inner core caulking portions in plan view is greater than or equal to about 0.5 times of an area of a circle including a radius same as a thickness of the thin plate core.

9. The rotor according to claim 1, wherein
 a shape of the inner core caulking portion in plan view is a circle or an ellipse; and
 a thickness in the axial direction of the thin plate core is smaller than or equal to a length of a shortest diameter of the circle or the ellipse.

10. The rotor according to claim 1, wherein
 a shape of the inner core caulking portion in plan view is a square or a rectangle; and
 a thickness in the axial direction of the thin plate core is smaller than or equal to a length of a shortest side of the square or the rectangle.

11. The rotor according to claim 1, wherein at least one of the plurality of thin plate cores includes a connection portion which connects the inner core portion to the outer core portion.

12. The rotor according to claim 11, wherein
the connection portion includes an upper connection portion positioned above a center of the connection portion in the axial direction of the laminated core, and a lower connection portion positioned below the center of the connection portion in the axial direction of the laminated core; and
a magnetic gap is interposed between the upper connection portion and the lower connection portion.

13. The rotor according to claim 12, further comprising a resin portion which covers both end surfaces in the axial direction of the laminated core and the plurality of magnets and radially outside surfaces of the plurality of magnets, and fills the magnetic gap.

14. A rotor, comprising:
a plurality of magnets which are arranged in a circumferential direction around a center axis which vertically extends;
a laminated core in which a plurality of thin plate cores are laminated in an axial direction; and
a resin portion which covers two axial end surfaces of the laminated core and radially outer surfaces of the plurality of magnets; wherein
the laminated core includes an inner core portion which axially extends in a cylindrical shape in a region located farther radially inward than the plurality of magnets, and a plurality of outer core portions which are arranged in the circumferential direction in a region located farther radially outward than the inner core portion;
the plurality of outer core portions and the plurality of magnets are alternately arranged in the circumferential direction;
the plurality of magnets include a pair of circumferential end surfaces which are magnetic pole surfaces;
the magnetic pole surfaces of the plurality of magnets of the same pole face each other in the circumferential direction;
the inner core portion and the plurality of outer core portions are connected by the resin portion;
the inner core portion includes a plurality of protruding portions which protrude radially outward between the adjacent plurality of outer core portions in the circumferential direction and inner core caulking portions which are positioned in the protruding portions or radially inside of the protruding portions and fix the plurality of thin plate cores; and
the plurality of outer core portions respectively include outer core caulking portions which fix the plurality of thin plate cores.

* * * * *